(12) United States Patent
Park et al.

(10) Patent No.: US 9,998,730 B2
(45) Date of Patent: *Jun. 12, 2018

(54) IMAGING OPTICAL SYSTEM AND 3D IMAGE ACQUISITION APPARATUS INCLUDING THE IMAGING OPTICAL SYSTEM

(71) Applicant: SAMSUNG ELECTRONICS CO., LTD., Suwon-si (KR)

(72) Inventors: Yong-hwa Park, Yongin-si (KR); Jang-woo You, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/589,506

(22) Filed: May 8, 2017

(65) Prior Publication Data

US 2017/0244953 A1 Aug. 24, 2017

Related U.S. Application Data

(63) Continuation of application No. 14/028,961, filed on Sep. 17, 2013, now Pat. No. 9,667,944.

(30) Foreign Application Priority Data

Oct. 10, 2012 (KR) .......................... 10-2012-0112660

(51) Int. Cl.
*H04N 13/02* (2006.01)
*H04N 5/33* (2006.01)

(52) U.S. Cl.
CPC ......... *H04N 13/0214* (2013.01); *H04N 5/332* (2013.01); *H04N 13/021* (2013.01);
(Continued)

(58) Field of Classification Search
CPC ...................... H04N 13/0239; H04N 13/0253; G01S 17/08; G01S 17/89
See application file for complete search history.

(56) References Cited

U.S. PATENT DOCUMENTS 6,100,517 A 8/2000 Yahav et al.
6,323,942 B1 11/2001 Bamji
(Continued)

FOREIGN PATENT DOCUMENTS

JP 2000-102035 A 4/2000
JP 2006-190958 A 7/2006
(Continued)

OTHER PUBLICATIONS

Masahiro Kawakita, et al; "High-Definition real-time depth-mapping TV camera: HDTV Axi-Vision Camera"; Optics Express; vol. 12; No. 12; Jun. 14, 2004; pp. 2781-2794.
(Continued)

*Primary Examiner* — Twyler Haskins
*Assistant Examiner* — Angel L Garces-Rivera
(74) *Attorney, Agent, or Firm* — Sughrue Mion, PLLC

(57) ABSTRACT

An imaging optical system includes an objective lens configured to focus light having a first wavelength band and light having a second wavelength band, an optical shutter module configured to reflect the light having the first wavelength band, which is focused by the objective lens, without modulating the light having the first wavelength band and to modulate the light having the second wavelength band, which is focused by the objective lens, and reflect the modulated light having the second wavelength band, and an image sensor configured to respectively sense the light having the first wavelength band and the modulated light having the second wavelength band, which are reflected by the optical shutter module, and to output a first image signal
(Continued)

with respect to the light having the first wavelength band and a second image signal with respect to the modulated light having the second wavelength band.

15 Claims, 17 Drawing Sheets

(52) U.S. Cl.
CPC ..... *H04N 13/0253* (2013.01); *H04N 13/0257* (2013.01); *H04N 2213/001* (2013.01)

(56) References Cited

U.S. PATENT DOCUMENTS

| | | | |
|---|---|---|---|
| 7,016,519 | B1 | 3/2006 | Nakamura et al. |
| 7,060,957 | B2 | 6/2006 | Lange et al. |
| 7,095,487 | B2 | 8/2006 | Gonzalez-Banos et al. |
| 7,138,619 | B1 | 11/2006 | Ferrante et al. |
| 7,224,384 | B1 | 5/2007 | Iddan et al. |
| 7,531,781 | B2 | 5/2009 | Sumi et al. |
| 8,902,411 | B2 | 12/2014 | Park et al. |
| 9,051,178 | B2 | 6/2015 | Cho et al. |
| 9,123,164 | B2 | 9/2015 | Park et al. |
| 9,402,067 | B2 | 7/2016 | Park et al. |
| 9,667,944 | B2 * | 5/2017 | Park .................... G01S 17/08 |
| 2008/0291532 | A1 | 11/2008 | Xu et al. |
| 2010/0328750 | A1 | 12/2010 | Kim et al. |
| 2011/0074659 | A1 | 3/2011 | Park et al. |
| 2011/0102547 | A1 | 5/2011 | Sul et al. |
| 2011/0134222 | A1 | 6/2011 | Yahav |
| 2011/0170160 | A1 | 7/2011 | Park et al. |
| 2011/0181936 | A1 | 7/2011 | Cho et al. |
| 2012/0162380 | A1 | 6/2012 | Cho et al. |
| 2012/0300038 | A1 | 11/2012 | You et al. |
| 2014/0014838 | A1 | 1/2014 | Hendrix et al. |
| 2015/0138620 | A1 | 5/2015 | Cho et al. |

FOREIGN PATENT DOCUMENTS

| | | |
|---|---|---|
| JP | 2008-147749 A | 6/2008 |
| JP | 2009-010627 A | 1/2009 |
| KR | 10-2009-0104857 A | 10/2009 |
| KR | 10-2011-0085785 A | 7/2011 |
| KR | 10-2011-0109031 A | 10/2011 |
| KR | 10-2011-0140010 A | 12/2011 |
| KR | 10-2012-0045462 A | 5/2012 |
| KR | 10-2012-0071970 A | 7/2012 |
| KR | 10-2012-0135751 A | 12/2012 |
| KR | 10-2013-0066287 A | 6/2013 |
| KR | 10-2013-0080641 A | 7/2013 |
| KR | 10-2013-0091194 A | 8/2013 |
| KR | 10-2014-0051030 A | 4/2014 |

OTHER PUBLICATIONS

Tahito Aida, et al.; "High-speed depth-mapping Axi-Vision Camera with compact optical system"; Three Dimensional Image Capture and Applications; vol. 6805; 2008; pp. 680511-1-680511-10.
Communication issued Nov. 20, 2017 issued by the Korean Intellectual Property Office in counterpart Korean Patent Application No. 10-2012-0112660.

* cited by examiner

IMAGING OPTICAL SYSTEM AND 3D IMAGE ACQUISITION APPARATUS INCLUDING THE IMAGING OPTICAL SYSTEM

CROSS-REFERENCE TO RELATED APPLICATION

This application is a continuation of U.S. application Ser. No. 14/028,961 filed on Sep. 17, 2013, which claims the benefit of Korean Patent Application No. 10-2012-0112660, filed on Oct. 10, 2012, in the Korean Intellectual Property Office, the disclosures of which are incorporated herein in their entirety by reference.

BACKGROUND

1. Field

The present disclosure relates to imaging optical systems and 3-dimensional (3D) image acquisition apparatuses, and more particularly, to imaging optical systems using one lens and one image sensor and 3D image acquisition apparatuses which are capable of acquiring a color image and a depth image at the same time by using the imaging optical system.

2. Description of the Related Art

Recently, with the development and the increased demand of 3D display devices displaying depth images, the importance of 3D content is being emphasized. Thus, 3D image acquisition apparatuses such as 3D cameras which are capable of directly producing 3D content based on user input are being researched. Such a 3D camera may acquire depth information together with existing 2D color image information through one photograph.

Depth information, which may be information related to a distance between surfaces of an object and a 3D camera, may be acquired by either a stereo vision method using two cameras or a triangulation method using structured light and a camera. However, it is difficult to acquire precise depth information through these methods because, as a distance between the object and the 3D camera is increased, the depth information is significantly decreased in accuracy. The depth information depends upon the surface state of the object.

To improve these limitations, a time-of-flight (TOF) technique has been introduced. The TOF technique is a method of measuring a TOF taken from a time period during which, after illumination light is projected onto an object, the illumination light reflected from the object is received by a light receiving unit. According to the TOF technique, light having a specific wavelength (for example, a near-infrared ray having a wavelength of about 850 nm) is projected onto a object by using an illumination optical system including a light emitting diode (LED) or a laser diode (LD). Then, the projected light is reflected from the object at the same specific wavelength and is received by a light receiving unit. Thereafter, a series of processes for extracting depth information, such as the modulation of the received light using a modulator having a previously known gain waveform, is performed. Various TOF techniques have been introduced according to the series of optical processing processes.

A 3D camera adopting the TOF technique includes an illumination optical system that emits illumination light for acquiring depth information and an imaging optical system for acquiring images of an object. The imaging optical system detects visible light reflected from the object to produce a general color image and simultaneously detects illumination light reflected from the object to produce a depth image having only depth information. Conventionally, the imaging optical system may separately include an objective lens and image sensor for detecting visible light and another objective lens and another image sensor for detecting illumination light (i.e., a 2-lens 2-sensor structure). However, in the 2-lens 2-sensor structure, a color image and a depth image have viewing angles different from each other. Thus, a separate process and applicable processing circuitry for matching the two images is required. As a result, the 3D camera may be increased in size, and also, manufacturing costs thereof may be increased.

Thus, a 3D camera including one common objective lens and two image sensors (i.e., a 1-lens 2-sensor structure) has been proposed. However, in the case of the 1-lens 2-sensor structure, visible light and illumination light are separated from each other, and thus are respectively transmitted to separate image sensors.

SUMMARY

According to exemplary embodiments, provided is an image optical system using one lens and one image sensor.

According to exemplary embodiments, provided is a 3D image acquisition apparatus which is capable of photographing a color image and a depth image at the same time by using the image optical system.

Additional aspects will be set forth in part in the description which follows and, in part, will be apparent from the description, or may be learned by practice of the presented exemplary embodiments.

According to an aspect of the exemplary embodiments, an imaging optical system includes: an objective lens configured to focus light having a first wavelength band and light having a second wavelength band, wherein the light having the first wavelength band and the light having the second wavelength band are reflected from an external object; an optical shutter module configured to reflect the light having the first wavelength band, which is focused by the objective lens, without modulating the light having the first wavelength band and to modulate the light having the second wavelength band, which is focused by the objective lens, and to reflect the modulated light having the second wavelength band; and an image sensor configured to respectively sense the light having the first wavelength band and the modulated light having the second wavelength band, which are reflected by the optical shutter module, and to output a first image signal with respect to the light having the first wavelength band and a second image signal with respect to the modulated light having the second wavelength band.

For example, the optical shutter module may include an optical shutter configured to modulate the light having the second wavelength band with a predetermined gain waveform and a wavelength-selective mirror disposed on a light incident surface of the optical shutter to reflect the light having the first wavelength band and transmit the light having the second wavelength band.

The optical shutter module may maintain a constant reflectance with respect to the light having the first wavelength band and has a reflectance varying according to a modulation signal with respect to the light having the second wavelength band.

According to an exemplary embodiment, the light having the first wavelength band may be visible light and the light having the second wavelength band may be NIR light, wherein the image sensor may have an array of a plurality of pixels, and each of the pixels may include a red sub-pixel configured to sense red light, a green sub-pixel configured to sense green light, a blue sub-pixel configured to sense blue light, and an NIR sub-pixel configured to sense the NIR light.

In addition, the imaging optical system may further include a time division filter disposed between the optical shutter module and the image sensor to selectively transmit one of the lights having the first wavelength band and the modulated light having the second wavelength band.

For example, the time division filter may be configured to transmit the light having the first wavelength band during a first time period and the modulated light having the second wavelength band during a second time period.

In addition, the time division filter may be configured to switch between a first color filter configured to transmit the light having the first wavelength band on an optical path between the optical shutter module and the image sensor, and a second color filter configured to transmit the modulated light having the second wavelength band on the optical path between the optical shutter module and the image sensor.

According to another exemplary embodiment, the light having the first wavelength band may be visible light, and the light having the second wavelength band may be NIR light, wherein the image sensor may have an array of a plurality of pixels, and each of the pixels may include a red sub-pixel configured to sense red light and the NIR light, a green sub-pixel configured to sense green light and the NIR light, and a blue sub-pixel configured to sense blue light and the NIR light.

For example, the image sensor may be configured to sense the light having the first wavelength band during the first time period and the modulated light having the second wavelength band during the second time period.

According to another exemplary embodiment, the image sensor may include a first sensing layer configured to sense the light having the first wavelength band and a second sensing layer disposed under the first sensing layer such that the first sensing layer is disposed between the second sensing layer and the optical shutter module, the second sensing layer being configured to sense the light having the second wavelength band.

For example, the light having the first wavelength band may be visible light, and the light having the second wavelength band is light having an NIR light, wherein the first sensing layer may include a red sub-pixel configured to sense the visible light having red light, a green sub-pixel configured to sense the visible light having green light, and a blue sub-pixel configured to sense the visible light having blue light.

In addition, the first sensing layer may further include a first color filter disposed on the red sub-pixel to transmit the red light and the NIR light, a second color filter disposed on the green sub-pixel to transmit the green light and the NIR light, and a third color filter disposed on the blue sub-pixel to transmit the blue light and the NIR light.

Also, the second sensing layer may include an NIR sub-pixel configured to sense the NIR light.

Also, the imaging optical system may further include a filter disposed between the first sensing layer and the second sensing layer to block the light having the first wavelength band.

According to another exemplary embodiment, the image sensor may include four sensing layers which are vertically stacked to respectively sense visible light having one of four light colors.

For example, the light having the first wavelength band may be visible light, and the light having the second wavelength band may be NIR light, wherein the four sensing layers may include a first sensing layer configured to sense visible light having a blue light, a second sensing layer configured to sense visible light having green light, a third sensing layer configured to sense visible light having red light, and a fourth sensing layer configured to sense the NIR light, which are sequentially disposed from an upper side closest to the optical shutter module to a lower side farthest from the optical shutter module.

In addition, the imaging optical system may further include a first filter disposed between the first sensing layer and the second sensing layer to block the blue light; a second filter disposed between the second sensing layer and the third sensing layer to block the green light; and a third filter disposed between the third sensing layer and the fourth sensing layer to block the red light.

Meanwhile, according to another aspect of the exemplary embodiments, a 3D image acquisition apparatus includes: an objective lens configured to focus light having a first wavelength band and light having a second wavelength band, wherein the light having the first wavelength band and the light having the second wavelength band are reflected from an external object; an optical shutter module configured to reflect the light having the first wavelength band, which is focused by the objective lens, without modulating the light having the first wavelength band and to modulate the light having the second wavelength band, which is focused by the objective lens, to reflect the modulated light having the second wavelength band; and an image sensor configured to respectively sense the light having the first wavelength band and the modulated light having the second wavelength band, which are reflected by the optical shutter module, and to output a first image signal with respect to the modulated light having the first wavelength band and a second image signal with respect to the modulated light having the second wavelength band; a light source configured to emit light having the second wavelength band onto the external object; an image signal processor configured to generate a 3D image by using the first and second image signals outputted from the image sensor; and a control unit configured to control operations of the light source and the image signal processing unit.

For example, the light source may be configured to emit the light having the second wavelength band with a predetermined period and waveform onto the external object under the control of the control unit.

For example, the light having the first wavelength band may be visible light, and the light having the second wavelength band may be NIR light, wherein the first image signal may be a color image signal having red, green, and blue color components, and the second image signal may be a depth image signal related to a distance between the 3D image acquisition apparatus and the external object.

In addition, the image signal processor may calculate the distance between the 3D image acquisition apparatus and the external object for each of a plurality of pixels by using the depth image signal, and the calculated distance may be combined with the color image signal to produce a final 3D image.

Also, the control unit may control the optical shutter module to modulate the light having the second wavelength band into a predetermined gain waveform having the same period as the light having the second wavelength band.

BRIEF DESCRIPTION OF THE DRAWINGS

These and/or other aspects will become apparent and more readily appreciated from the following description of the exemplary embodiments, taken in conjunction with the accompanying drawings of which.

DETAILED DESCRIPTION

Figure 1:
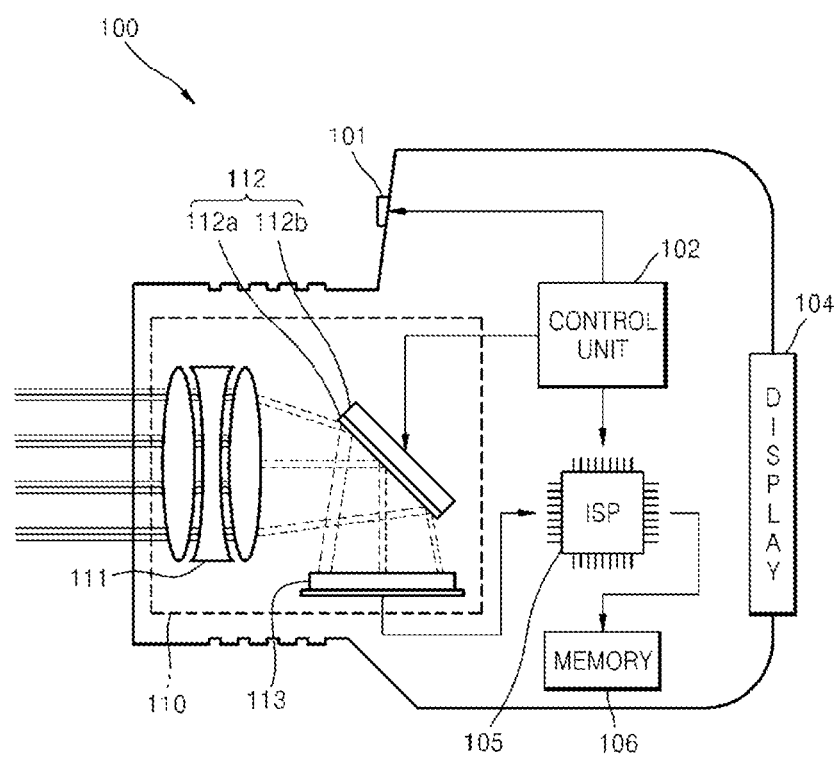
FIG. 1 is a conceptual view of an imaging optical system and a 3D image acquisition apparatus including the imaging optical system according to an exemplary embodiment.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

FIG. 1 is a conceptual view of an imaging optical system and a 3D image acquisition apparatus including the imaging optical system according to an exemplary embodiment.

Referring to FIG. 1, a 3D image acquisition apparatus 100 according to an exemplary embodiment includes a light source 101 configured to generate illumination light having a predetermined wavelength band, an imaging optical system 110 configured to generate a color image signal and a depth image signal by using visible light and the illumination light which are reflected from an external object (not shown), an image signal processing unit 105 (e.g., image signal processor) configured to produce a 3D image by using the color image signal and the depth image signal, and a control unit 102 configured to control operations of the light source 101, the imaging optical system 110, and the image signal processing unit 105. Also, the 3D image acquisition apparatus 100 may further include a memory 106 configured to store a final 3D image and a display panel 104 configured to display the final 3D image.

Also, the imaging optical system 110 according to an exemplary embodiment may include an objective lens 111 configured to focus the visible light and the illumination light which are reflected from the external object, an optical shutter module 112 configured to reflect the visible light focused by the objective lens 111 without modulating the visible light and configured to modulate the illumination light focused by the objective lens 111 to reflect the modulated illumination light, and an image sensor 113 configured to sense the visible light and the illumination light, which are reflected by the optical shutter module 112, to generate the color image signal and the depth image signal.

According to an exemplary embodiment, for example, a light emitting diode (LED) or a laser diode (LD) which emit illumination light having a near-infrared (NIR) wavelength of about 850 nm, which is invisible to the human eye for safety, may be used as the light source 101. However, this is merely an example, and thus, according to other exemplary embodiments, illumination light having an adequately different wavelength band and a different kind of light source may be used according to the design of the light source 101. Also, the light source 101 may emit illumination light having a specific waveform, for example, a sine wave, a ramp wave, a square wave, and the like according to a control signal received from the control unit 102.

Figure 2:
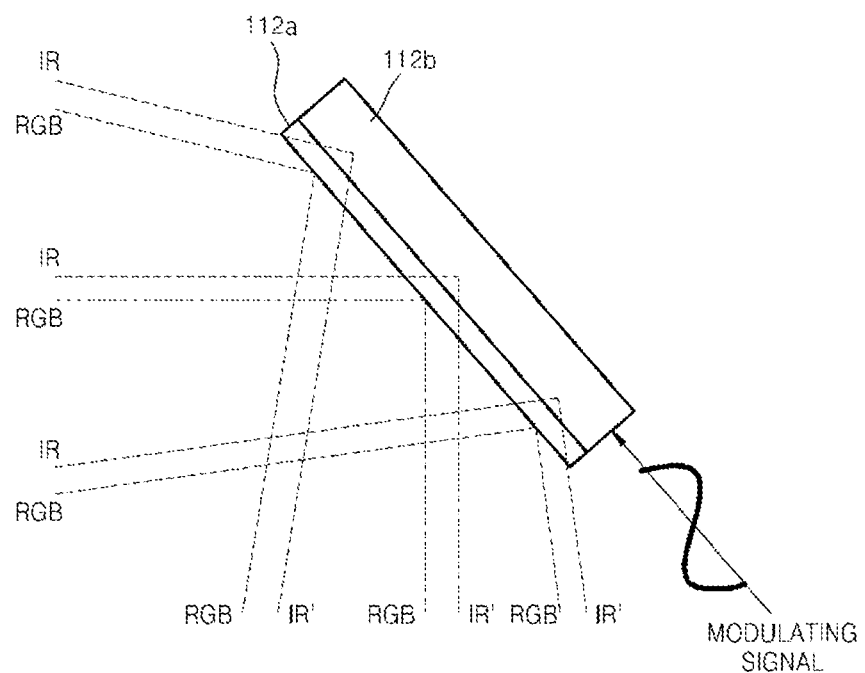
FIG. 2 is an enlarged view illustrating a structure of an optical shutter module of FIG. 1.

FIG. 2 is an enlarged view illustrating a structure of the optical shutter module 112 of FIG. 1. Referring to FIG. 2, the optical shutter module 112 includes an optical shutter 112b configured to modulate illumination light with a predetermined gain waveform according to a TOF method and a wavelength-selective mirror 112a disposed on a light incident surface of the optical shutter 112b. For example, the wavelength-selective mirror 112a may reflect light RGB having a wavelength band corresponding to that of the visible light and transmit light IR having a wavelength band corresponding to that of the illumination light. Thus, of the light incident onto the optical shutter module 112, the visible light RGB is reflected by the wavelength-selective mirror 112a toward the image sensor 113, and the illumination light IR is transmitted through the wavelength-selective mirror 112a to reach the optical shutter 112b. The wavelength-selective mirror 112a may be, for example, coated in a thin film form on a surface of the optical shutter 112b.

According to an exemplary embodiment, the optical shutter 112b modulates the illumination light IR according to a modulation signal applied from the control unit 102 and reflects the modulated illumination light IR' toward the image sensor 113. The optical shutter 112 may be, for example, a GaAs-based reflective modulator which is operable at an ultra-high speed of about several tens of MHz to about several hundreds of MHz and has a reflectance varying according to the modulation signal.

Figure 3:
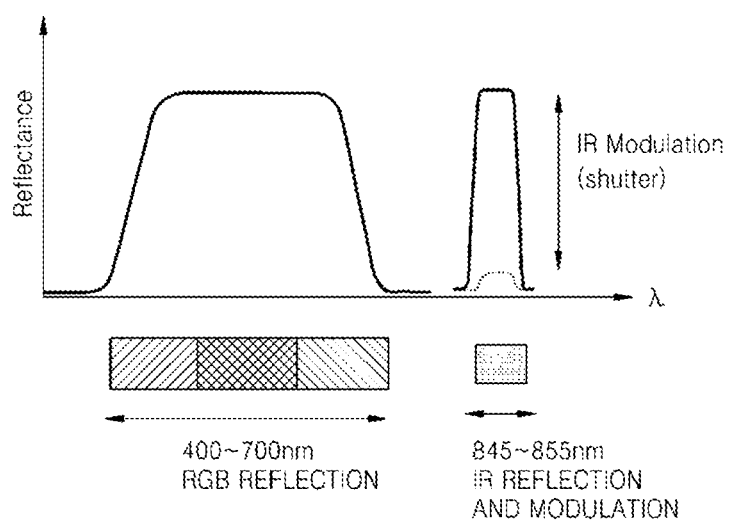
FIG. 3 is a graph for explaining operation characteristics of the optical shutter module of FIG. 1.

FIG. 3 is a graph for explaining operation characteristics of the optical shutter module 112 having the above-described structure. Referring to FIG. 3, since the wavelength-selective mirror 112a of the optical shutter module 112 reflects the light RGB having the wavelength band corresponding to that of the visible light, the optical shutter module 112 may maintain a constant high reflectance at all times with respect to the visible light having a wavelength band of about 400 nm to about 700 nm. However, since the illumination light IR having the NIR light is transmitted through the wavelength-selective mirror 112a and then is modulated by the optical shutter 112b, the optical shutter module 112 may have a reflectance varying according to the modulation signal with respect to the illumination light IR having a wavelength band of about 845 nm to about 855 nm.

Figure 4:
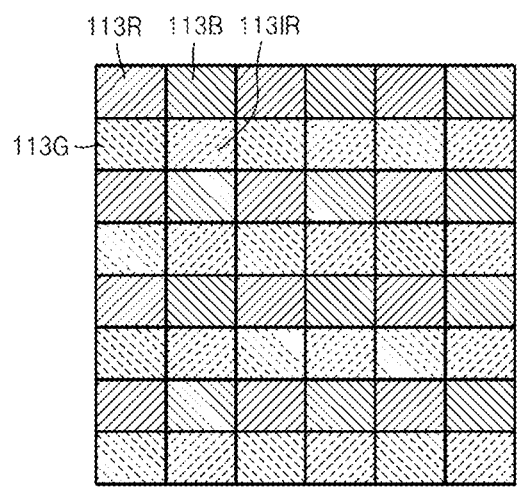
FIG. 4 is a schematic plan view illustrating a pixel structure of an image sensor of FIG. 1.
Figure 5A:
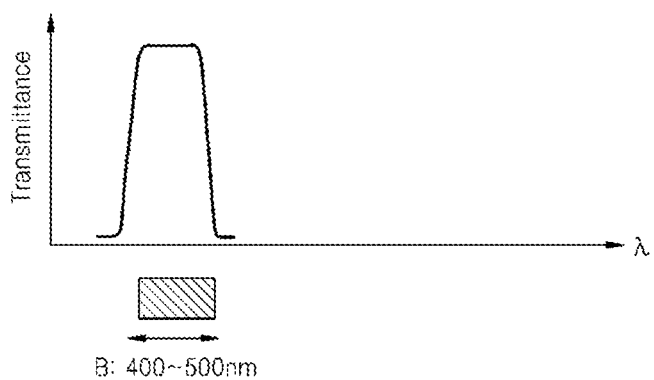
FIGS. 5A through 5D are graphs illustrating transmittance characteristics of color filters arranged within the image sensor of FIG. 4.
Figure 5B:
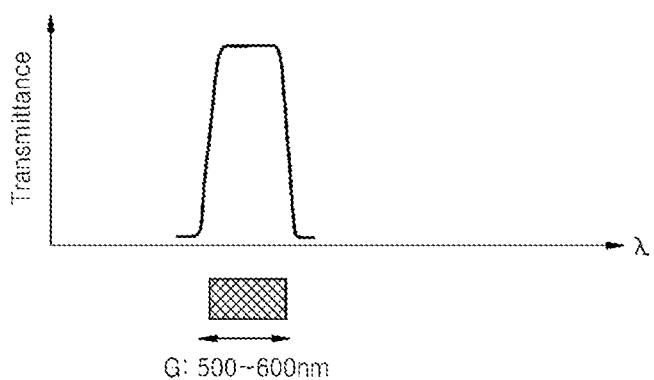
Figure 5C:
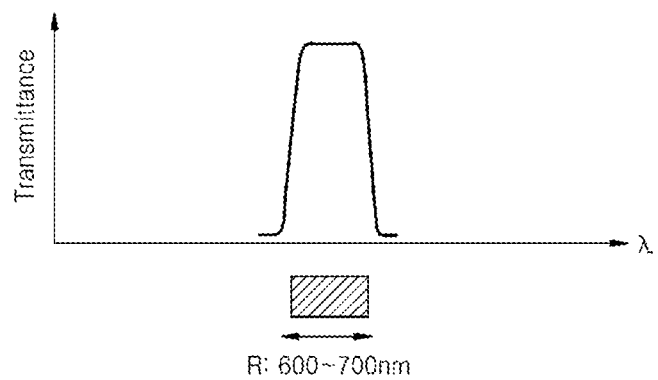
Figure 5D:
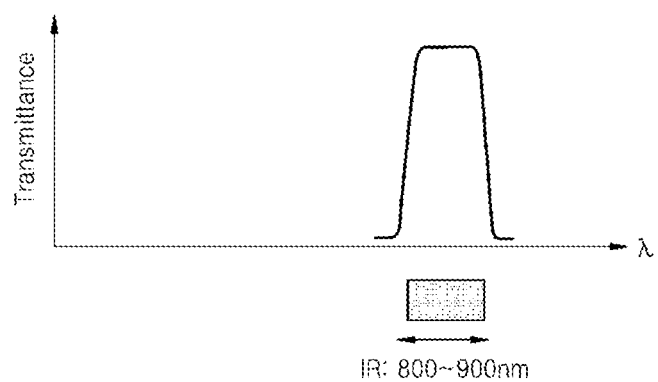

The visible light RGB reflected by the optical shutter module 112 and the illumination light IR modulated and reflected by the optical shutter module 112 may be sensed by one image sensor 113. The image sensor 113 may be implemented as a semiconductor imaging device such as a charge-coupled device (CCD) or a complementary metal oxide semiconductor (CMOS). The image sensor 113 has an array of a plurality of pixels. FIG. 4 is a schematic plan view illustrating a pixel structure of the image sensor 113 of FIG. 1. Each of the pixels of the image sensor 113 may include a plurality of sub-pixels each having different sensitivities to wavelengths. Referring to FIG. 4, the image sensor 113 may include a red sub-pixel 113R that senses red light, a green sub-pixel 113G that senses green light, a blue sub-pixel 113B that senses blue light, and an NIR sub-pixel 113IR that senses illumination light having an NIR light. Since the image sensor 113 further includes the NIR sub-pixel 113IR capable of sensing the illumination light having the NIR light in addition to the general red, green, and blue sub-pixels 113R, 113G, and 113B, the image sensor 113 may sense the visible light and the illumination light at the same time.

The image sensor 113 may be realized by respectively disposing color filters having different transmittance characteristics on light incident surfaces of the sub-pixels. For example, FIGS. 5A to 5D are graphs illustrating transmittance characteristics of color filters arranged within the image sensor 113 of FIG. 4. Referring to FIGS. 5A to 5D, a color filter transmitting only blue light having a wavelength of about 400 nm to about 500 nm may be disposed on the blue sub-pixel 113B, and a color filer transmitting only green light having a wavelength of about 500 nm to about 600 nm may be disposed on the green sub-pixel 113G. Also, a color filter transmitting only red light having a wavelength of about 600 nm to about 700 nm may be disposed on the red sub-pixel 113R, and a color filter transmitting only an NIR ray having a wavelength of about 800 nm to about 900 nm may be disposed on the NIR sub-pixel 113IR. Alternatively, a photosensitive material having different sensitivities to each wavelength may be used for each sub-pixel, instead of using the color filters.

The image sensor 113 converts the intensity of the incident light for each sub-pixel into an electrical image signal and outputs the electrical image signal for each sub-pixel to the image signal processing unit 105. The image signal processing unit 105 produces a color image using electrical signals provided from the red, green, and blue sub-pixels 113R, 113G, and 113B of the image sensor 113 and produces a depth image using an electrical signal provided from the NIR sub-pixel 113IR.

Hereinafter, an example operation of the 3D image acquisition apparatus 100 will be briefly described.

First, the light source 101 projects, for example, the NIR illumination light onto an object, the light source 101 being operated under the control of the control unit 102. For example, the light source 101 may project at least three illumination lights having the same period and different phases onto the object in a sequential order of time according to the TOF method.

Then, the NIR illumination light reflected by the object is focused by the objective lens 111. Simultaneously, the general visible light reflected from the object may also be focused by the objective lens 111. Of the light focused by the objective lens 111, the visible light may be reflected by the wavelength-selective mirror 112a to be incident onto the image sensor 113. On the other hand, the illumination light may pass through the wavelength-selective mirror 112a to be incident onto the optical shutter 112b. The light incident onto the optical shutter 112b may be modulated and reflected by the optical shutter 112b and then be incident onto the image sensor 113. Here, the optical shutter 112b may sequentially modulate the at least three illumination lights by using a predetermined gain waveform having the same period as each of the at least three illumination lights according to the TOF method.

The image sensor 113 converts the intensity of the visible light incident onto each of the red, green, and blue sub-pixels into an electrical color image signal and provides an electrical color image signal for each of the red, green, and blue sub-pixels to the image signal processing unit 105. Also, the image sensor 113 sequentially converts the intensities of each of the at least three modulated illumination lights incident onto the NIR sub-pixel 113IR to successively provide the produced at least three electrical depth image signals to the image signal processing unit 105. The image signal processing unit 105 produces a color image by using the electrical color image signals provided from the image sensor 113. Also, the image signal processing unit 105 calculates, for each pixel, a distance between the object and the 3D image acquisition apparatus 100 by using the at least three electrical depth image signals provided from the image sensor 113. The image signal processing unit 105 produces a depth image from the calculated results. Thus, the color image and the depth image may be combined with each other to produce a 3D image. The produced 3D image may be, for example, stored in the memory 106 or displayed on the display panel 104 according to a user selection. Since an algorithm used to calculate the distance between the object and the 3D image acquisition apparatus 100 by using the at least three electrical depth image signals may be performed according to the normal TOF method, a detailed description thereof will be omitted.

As described above, the imaging optical system 110 according to the current exemplary embodiment may obtain the color image and the depth image at the same time by using only one common objective lens 111 and only one image sensor 113. Thus, when compared to a case in which two lenses and two image sensors are provided, or one lens and two image sensors are provided, the number of components may be decreased to reduce production costs. In addition, the imaging optical system 110 and the 3D image acquisition apparatus 100 including the imaging optical system 110 may be reduced in size and weight. Also, since the color image and the depth image are photographed using the same objective lens 111 and have the same viewing angle, it is unnecessary to perform a process of matching their respective viewing angles. Also, since the color image and the depth image are obtained through the same image sensor 113, image matching between the pixels within the color and depth images may be easily performed.

Figure 6:
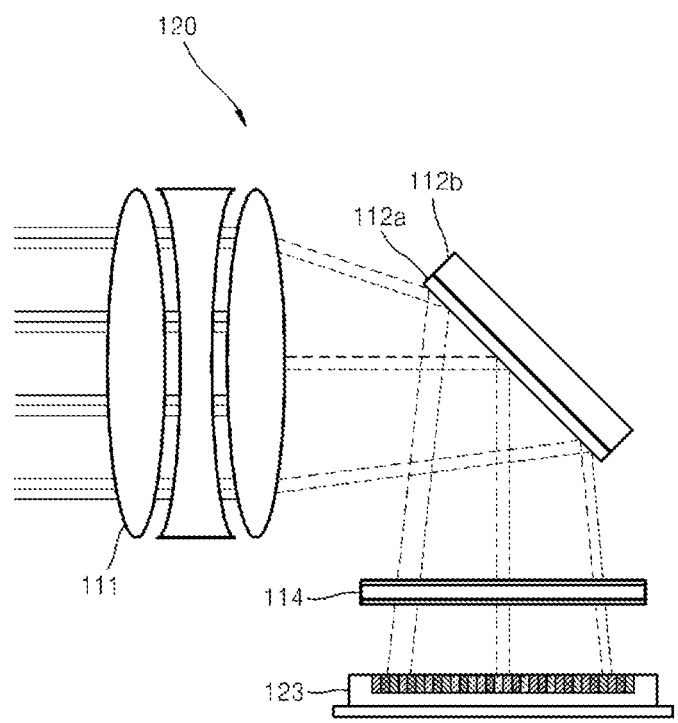
FIG. 6 is a schematic conceptual view illustrating a structure of an imaging optical system according to another exemplary embodiment.

Although the image sensor 113 senses the visible light and the illumination light at the same time by using a space division method according to the exemplary embodiment of FIG. 1, it may be possible to sense the visible light and the illumination light at different times by using a time division method. FIG. 6 is a schematic conceptual view illustrating a structure of an image optical system 120 according to another exemplary embodiment which implements the time division method.

Referring to FIG. 6, the imaging optical system 120 may include an objective lens 111 configured to focus visible light and illumination light which are reflected from an external object, an optical shutter module 112 configured to reflect the visible light focused by the objective lens 111 without modulating the visible light and modulate the illumination light focused by the objective lens 111 to reflect the modulated illumination light, an image sensor 123 configured to respectively sense the visible light and the illumination light, which are reflected by the optical shutter module 112, and to generate a color image signal and a depth image signal, and a time division filter 114 disposed between the optical shutter module 112 and the image sensor 123 to selectively transmit only one of the visible light and the illumination light.

Figure 7:
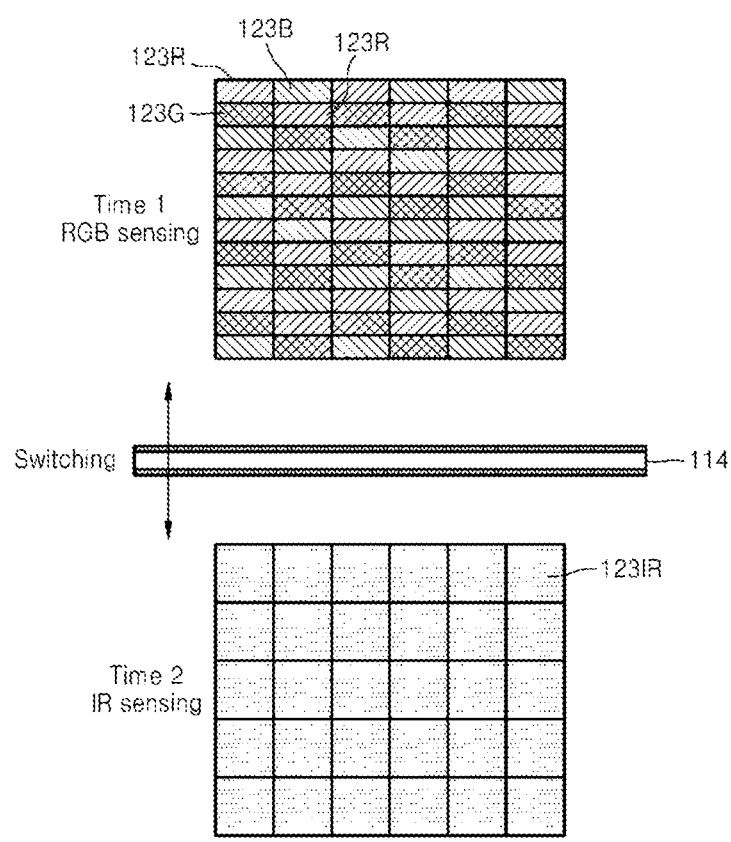
FIG. 7 is a view illustrating an example of an operation of a time-division filter and an image sensor of FIG. 6.
Figure 8A:
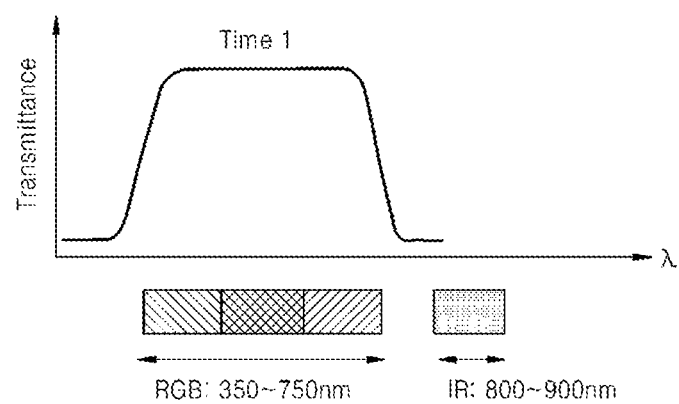
FIGS. 8A and 8B are graphs illustrating transmittance characteristics for explaining an operation of the time-division filter of FIG. 6.
Figure 8B:
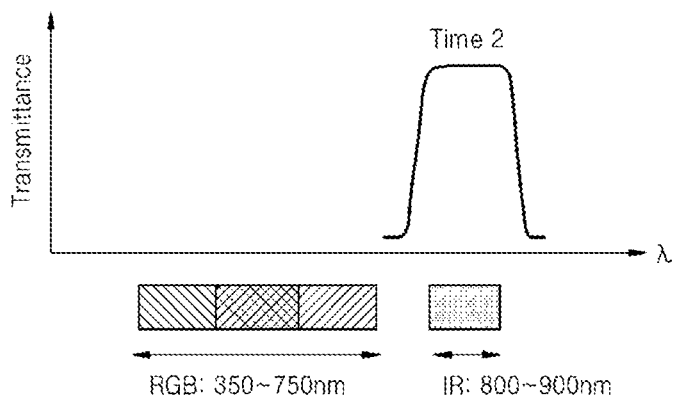

According to the exemplary embodiment shown in FIG. 7, the time division filter 114 may be configured to transmit only the visible light at a time 1 so that the image sensor 123 senses only the visible light at time 1 and transmit only the illumination light at a time 2 so that the image sensor 123 senses only the illumination light at time 2. For example, the time division filter 114 may transmit visible light having a wavelength band of about 350 nm to about 700 nm at the time 1 as shown in FIG. 8A. Also, the time division filter 114 may transmit illumination light having a wavelength band in a range of about 800 nm to about 900 nm at the time 2 as shown in FIG. 8B. The time division filter 114 may be realized using a disc-shaped color wheel in which a semicircular color filter configured to transmit the visible light and a semicircular color filter configured to transmit the NIR ray are coupled to each other. For example, the color wheel may be rotated using a motor such that, at the time 1, the color filter configured to transmit the visible light is located on an optical path. Also, the color wheel may be rotated using the motor such that, at the time 2, the color filter configured to transmit the NIR ray is located on the optical path. Furthermore, according to other exemplary embodiments, instead of the color wheel, any mechanical or electrical structure which switches a location of the color filter configured to transmit the visible light and the color filter configured to transmit the NIR ray on an optical path between the optical shutter module 112 and the image sensor 123 may be implemented.

Since the visible light and the illumination light are sensed at different times, the image sensor 123 may only include three kinds of sub-pixels. For example, as shown in an upper side of FIG. 7, the image sensor 123 may include a red sub-pixel 123R that senses red light, a green sub-pixel 123G that senses green light, and a blue sub-pixel 123B that senses blue light. Also, according to the current exemplary embodiment, the sub-pixels 123R, 123G, and 123B may all be configured to sense the illumination light having the NIR light at the time 2. That is, the red sub-pixel 123R may sense the red light and the NIR ray, the green sub-pixel 123G may sense the green light and the NIR ray, and the blue sub-pixel 123B may sense the blue light and the NIR ray.

Figure 9A:
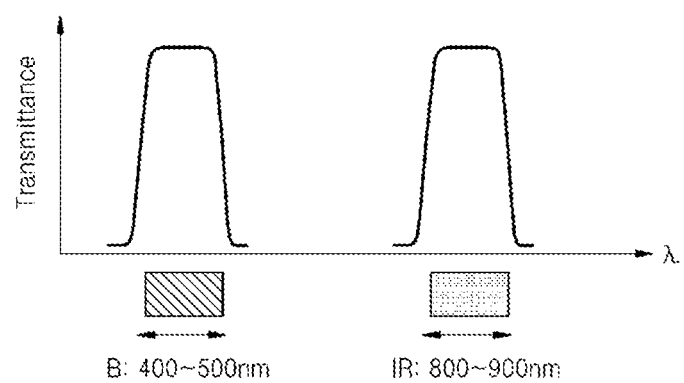
FIGS. 9A through 9C are graphs illustrating transmittance characteristics of color filters arranged within the image sensor of FIG. 6.
Figure 9B:
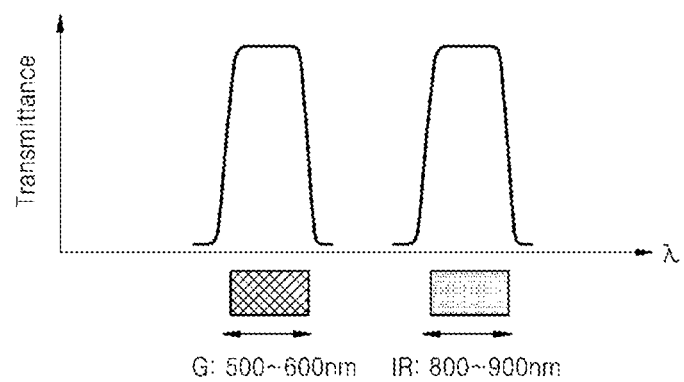
Figure 9C:
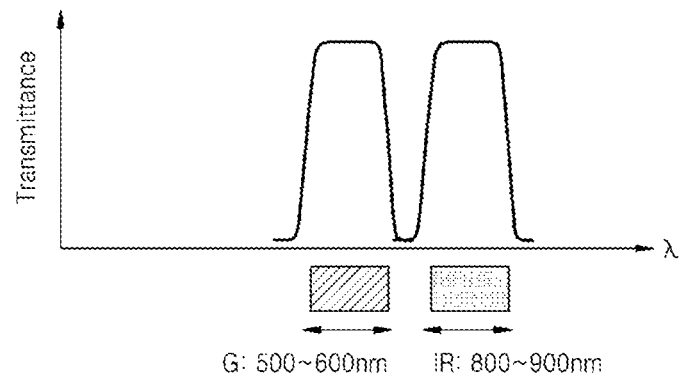

FIGS. 9A through 9C are graphs illustrating transmittance characteristics of color filters arranged on light incident surfaces of the image sensor 123 according to an exemplary embodiment. Referring to FIGS. 9A through 9C, a color filter configured to transmit blue light having a wavelength of about 400 nm to about 500 nm and an NIR ray having a wavelength of about 800 nm to about 900 nm may be disposed on the blue sub-pixel 123B. Also, a color filter configured to transmit green light having a wavelength of about 500 nm to about 600 nm and the NIR ray having the wavelength of about 800 nm to about 900 nm may be disposed on the green sub-pixel 123G, and a color filter configured to transmit red light having a wavelength of about 600 nm to about 700 nm and the NIR ray having the wavelength of about 800 nm to about 900 nm may be disposed on the red sub-pixel 123R. The sub-pixels 123R, 123G, and 123B of the image sensor 123 may sense the red, green, and blue light at a time 1, and the image sensor 123 may sense the illumination light having the NIR light in the entire region of the image sensor 123 at the time 2.

The imaging optical system 120 may be applied to the 3D image acquisition apparatus 100 of FIG. 1. Hereinafter, an example operation of the 3D image acquisition apparatus including the imaging optical system 120 of FIG. 6 will be described.

The control unit 102 controls the time division filter 114 to transmit visible light at a time 1 and sense the visible light through the image sensor 123. The image signal processing unit 105 produces a color image by using an image signal provided from the image sensor 123. The control unit 102 controls the time division filter 114 to transmit the illumination light and controls the light source 101 to emit illumination light at a time 2. Thus, the image sensor 123 senses the illumination light, and the image signal processing unit 105 produces a depth image according to the TOF method by using the image signal provided from the image sensor 123.

As described above, at least three illumination lights having different phases may be sequentially projected onto the object. The at least three illumination lights may be sensed at the time 2 all at once. Alternatively, the at least three illumination lights may be separately sensed at several different times. For example, in a case where four illumination lights are used, the visible light may be sensed at the time 1, and then, the four illumination lights may be sequentially sensed at different times (e.g., four different times 2). In this case, the light source 101 may sequentially project four illumination lights each having different phases onto the object at the time 2. Alternatively, the illumination light including the four illumination lights may be sensed over the four times 2, in the order of: visible light (time 1)→illumination light 1 (time 2)→visible light (time 1)→illumination light 2 (time 2)→visible light (time 1)→illumination light 3 (time 2)→visible light (time 1)→illumination light 4 (time 2). Alternatively, the illumination light including the four illumination lights may be sensed over two times 2, in the order of: visible light (time 1)→illumination light 1, 2 (time 2)→visible light (time 1)→illumination light 3, 4 (time 2) at the time 2.

According to an exemplary embodiment, when the visible light is sensed at the time 1, only three kinds of sub-pixels 123R, 123G, and 123B are used within the image sensor 123. Thus, when compared to a case in which four kinds of sub-pixels are used, the color image may be improved in resolution. Also, when the illumination light is sensed at the time 2, the illumination light may be sensed throughout the entire area of the image sensor 123. Thus, distance calculation may be increased in accuracy, and light utilization efficiency may be improved.

Figure 10:
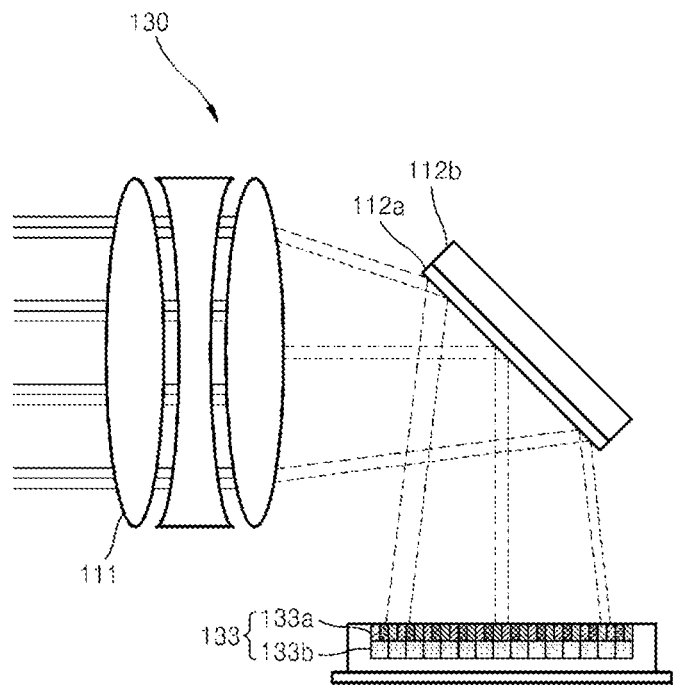
FIG. 10 is a schematic conceptual view of a structure of an imaging optical system according to another exemplary embodiment.

FIG. 10 is a schematic conceptual view of a structure of an imaging optical system 130 according to another exemplary embodiment.

Referring to FIG. 10, the imaging optical system 130 includes an objective lens 111 configured to focus visible light and illumination light which are reflected from an external object, an optical shutter module 112 configured to reflect the visible light focused by the objective lens 111 without modulating the visible light and modulate the illumination light focused by the objective lens 111 to reflect the modulated illumination light, and an image sensor 133 configured to respectively sense the visible light and the illumination light, which are reflected by the optical shutter module 112, to generate a color image signal and a depth image signal.

The exemplary embodiment of FIG. 10 is different from that of FIG. 1 in that the image sensor 133 includes two sensing layers which are vertically stacked. That is, the image sensor 133 includes a first sensing layer 133a and a second sensing layer 133b which are vertically stacked. The first sensing layer 133a may be formed of a light absorption material such as silicon and may be disposed on the second sensing layer 133b to sense the visible light. Also, the second sensing layer 133b disposed under the first sensing layer 133a may be formed as an illumination layer to sense the NIR light. In general, light having a relatively short wavelength may have a relatively shallow penetration depth with respect to a light absorption material such as silicon, and light having a relatively long wavelength may have a relatively deep penetration depth with respect to the light absorption material. The second sensing layer 133b configured to sense the illumination light is disposed under the first sensing layer 133a because the illumination light has a relatively long wavelength and is able to more deeply penetrate through the first sensing layer 133a and reach the second sensing layer 133b.

Figure 11:
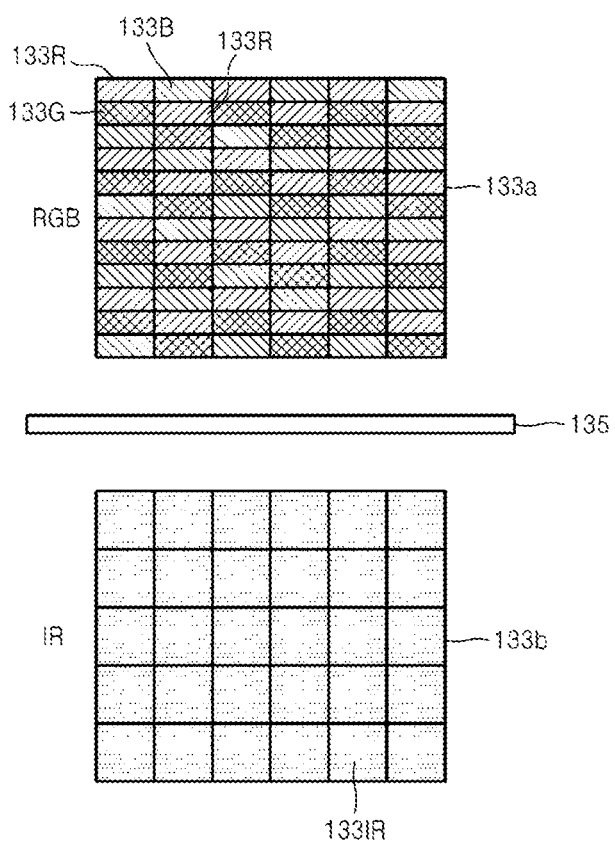
FIG. 11 is a schematic plan view illustrating a structure of each of a plurality of sensing layers within an image sensor of FIG. 10.

FIG. 11 is a schematic plan view illustrating a structure of each of a plurality of sensing layers within the image sensor 133 of FIG. 10. As shown in FIG. 11, the first sensing layer 133a may include only three kinds of sub-pixels. For example, the first sensing layer 133a may include a red sub-pixel 133R that senses red light, a green sub-pixel 133G that senses green light and a blue sub-pixel 133B that senses blue light. In the current exemplary embodiment, transmittance characteristics of color filters disposed on the sub-pixels 133R, 133G, and 133B may be the same as those of the color filters illustrated in FIGS. 9A to 9C. That is, referring to FIGS. 9A through 9C, a color filter configured to transmit blue light having a wavelength of about 400 nm to about 500 nm and an NIR ray having a wavelength of about 800 nm to about 900 nm may be disposed on the blue sub-pixel 133B. Also, a color filter configured to transmit green light having a wavelength of about 500 nm to about 600 nm and the NIR ray having the wavelength of about 800 nm to about 900 nm may be disposed on the green sub-pixel 133G, and a color filter configured to transmit red light having a wavelength of about 600 nm to about 700 nm and the NIR ray having the wavelength of about 800 nm to about 900 nm may be disposed on the red sub-pixel 133R.

Figure 12A:
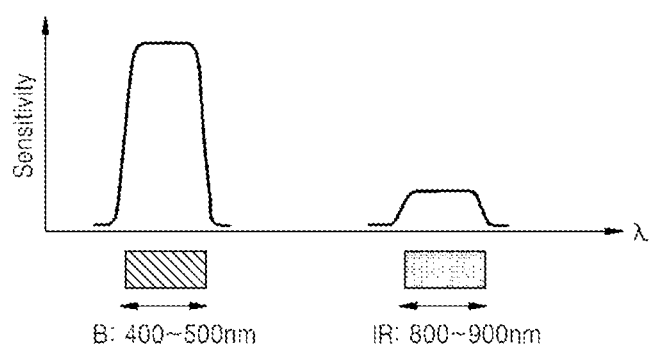
FIGS. 12A through 12C are graphs illustrating an example of sensitivities according to wavelengths for each pixel within a color image sensing unit according to exemplary embodiments.
Figure 12B:
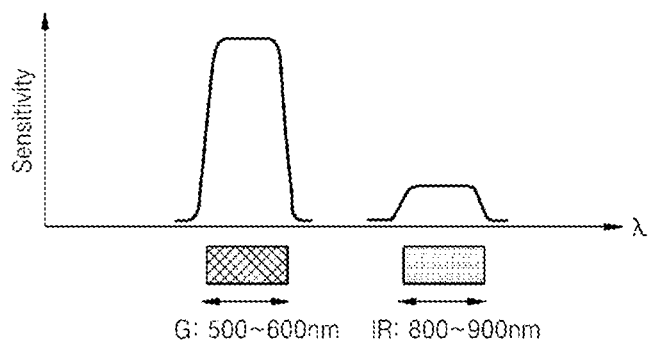
Figure 12C:
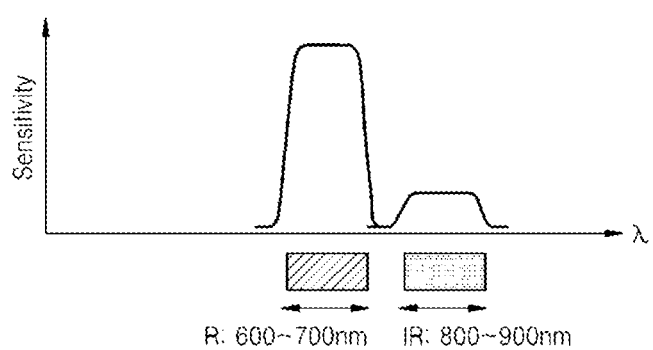

Thus, the illumination light having the NIR ray together with the visible light are incident onto each of the sub-pixels 133R, 133G, and 133B of the first sensing layer 133a. To remove an effect caused by the illumination light, as shown in FIGS. 12A through 12C, the sub-pixels 133R, 133G, and 133B may be formed of photosensitive materials having different sensitivities based on wavelength. For example, the blue sub-pixel 133B may be formed of a photosensitive material having high sensitivity with respect to blue light having a wavelength of about 400 nm to about 500 nm. Also, the green sub-pixel 133G may be formed of a photosensitive material having high sensitivity with respect to green light having a wavelength of about 500 nm to about 600 nm, and the red sub-pixel 133R may be formed of a photosensitive material having high sensitivity with respect to red light having a wavelength of about 600 nm to about 700 nm.

Figure 13:
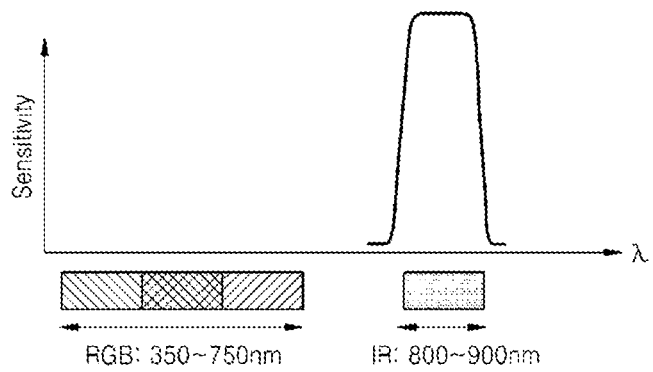
FIG. 13 is a graph illustrating an example of sensitivities according to wavelengths for each pixel within an IR image sensing unit according to exemplary embodiments.

The second sensing layer 133b senses the illumination light that is transmitted through the first sensing layer 133a. In the current exemplary embodiment, the second sensing layer 133b includes only a single type of sub-pixel 133IR that senses the illumination light. That is, as shown in FIG. 13, the second sensing layer 133b may be configured so that the all pixels in the sensing layer 133b have high sensitivities with respect to the illumination light. Here, to remove an effect caused by the remaining visible light that is not absorbed by the first sensing layer 133a, as shown in FIG. 11, a filter 135 blocking the visible light may be disposed between the first sensing layer 133a and the second sensing layer 133b.

Alternatively, according to other exemplary embodiments, the sub-pixels 133R, 133G, and 133B may be formed of the same photosensitive material, instead of being formed of different photosensitive materials. For example, the light incident onto the blue sub-pixel 133B of the first sensing layer 133a may have the same intensity as the sum of the blue light and the illumination light. On the other hand, the sub-pixel 133IR of the second sensing layer 133a may sense only the illumination light. Thus, considering the intensity of the illumination light sensed by the sub-pixel 133IR of the second sensing layer 133b facing the blue sub-pixel 133B of the first sensing layer 133a, the intensity of the blue light incident onto the blue sub-pixel 133B of the first sensing layer 133a may be calculated. Similarly, considering the intensity of the illumination light sensed by the sub-pixel 133IR of the second sensing layer 133b, intensities of the green and red light incident onto the green and red sub-pixels 133G and 133R of the first sensing layer 133a facing the sub-pixel 133IR of the second sensing layer 133b may be calculated.

According to the exemplary embodiment of FIG. 10, the visible light and the illumination light may be sensed at the same time without performing a time division process, and also, advantages described in the exemplary embodiment of FIG. 6 may be obtained.

Figure 14:
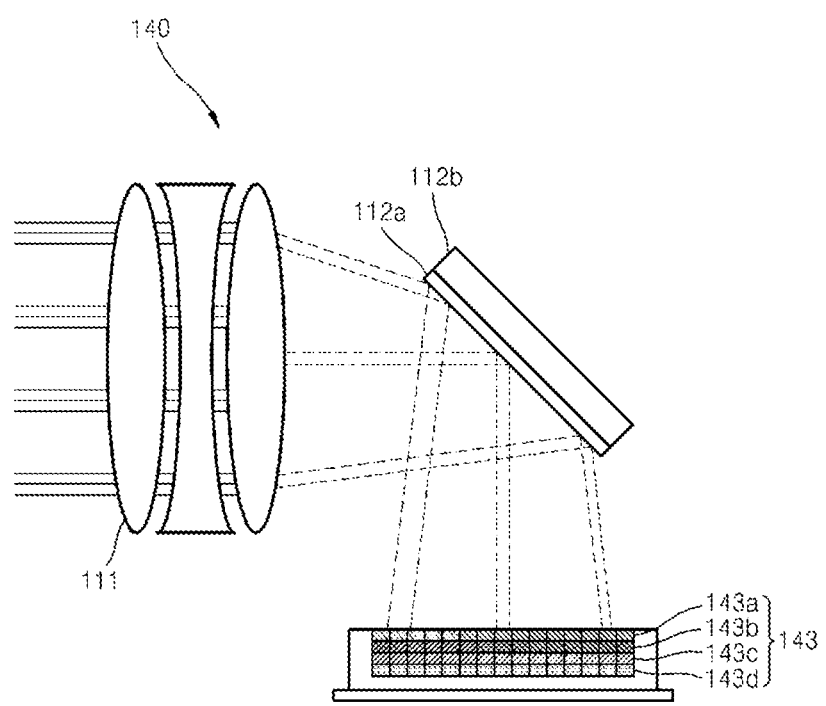
FIG. 14 is a schematic conceptual view illustrating a structure of an imaging optical system according to another exemplary embodiment.

FIG. 14 is a schematic conceptual view illustrating a structure of an imaging optical system 140 according to another exemplary embodiment.

Referring to FIG. 14, the imaging optical system 140 may include an objective lens 111 configured to focus visible light and illumination light which are reflected from an external object, an optical shutter module 112 configured to reflect the visible light focused by the objective lens 111 without modulating the visible light and modulate the illumination light focused by the objective lens 111 to reflect the modulated illumination light, and an image sensor 143 configured to respectively sense the visible light and the illumination light, which are reflected by the optical shutter module 112, to generate a color image signal and a depth image signal.

The exemplary embodiment of FIG. 14 is different from the exemplary embodiment of FIG. 10 in that the image sensor 143 includes four sensing layers which are vertically stacked. That is, although the image sensor 133 includes only the first sensing layer 133a configured to sense the visible light and the second sensing layer 133b configured to sense the NIR ray in the exemplary embodiment of FIG. 10, the image sensor 143 may include four sensing layers 143a to 143d respectively configured to sense the red, green and blue light and the NIR ray in the exemplary embodiment of FIG. 14.

Figure 15:
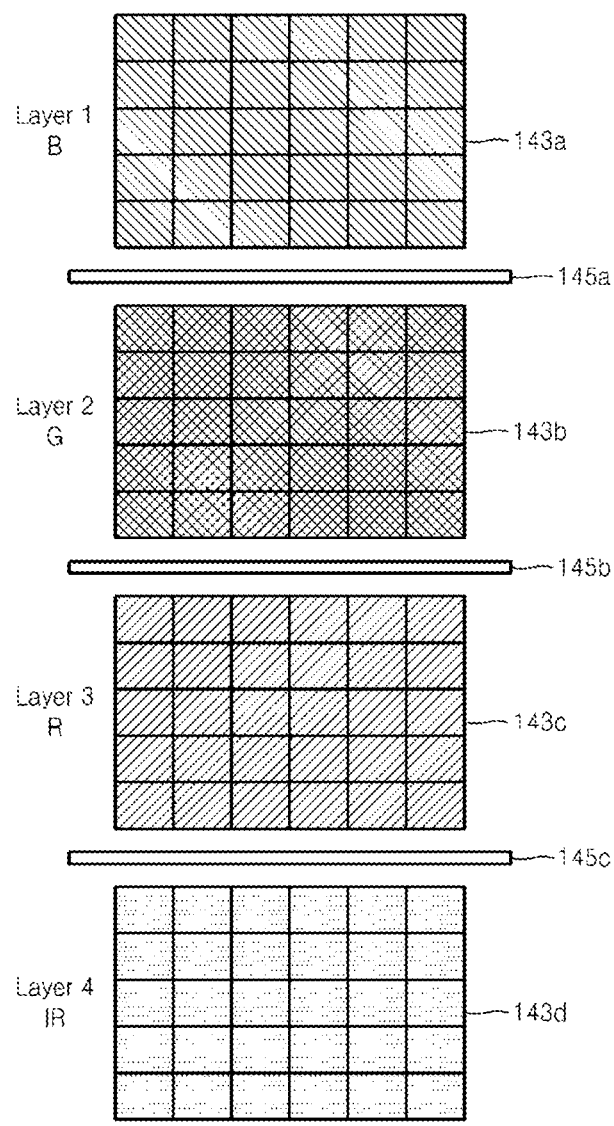
FIG. 15 is a schematic plan view illustrating a structure of each of a plurality of sensing layers within an image sensor of FIG. 14.
Figure 16A:
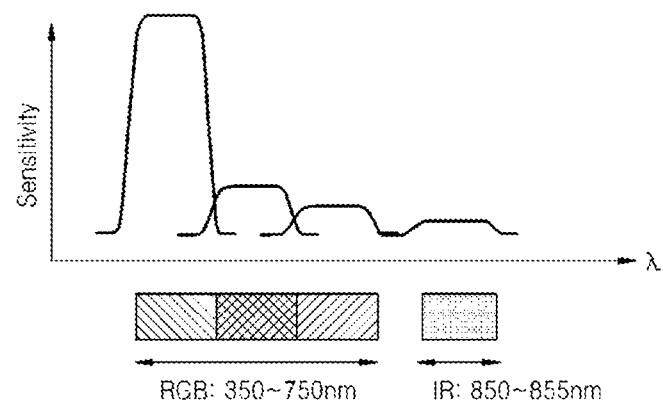
FIGS. 16A through 16D are graphs illustrating an example of sensitivities according to wavelengths for each of a plurality of sensing layers of an image sensor of FIG. 15.
Figure 16B:
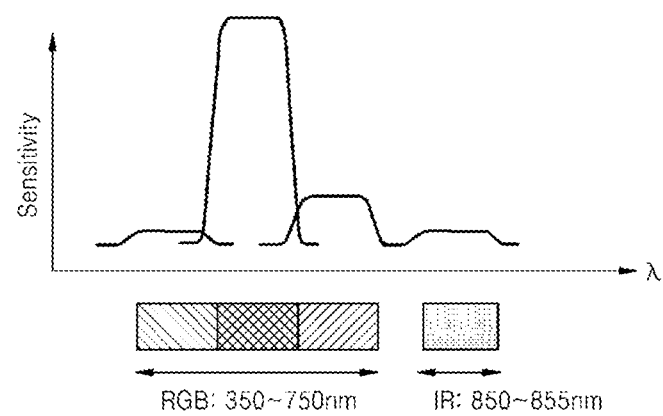
Figure 16C:
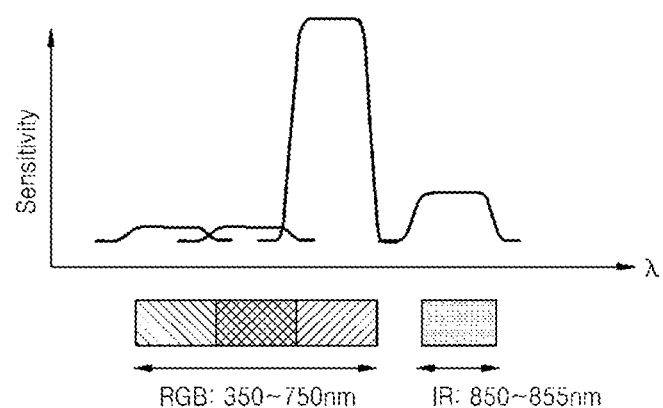
Figure 16D:
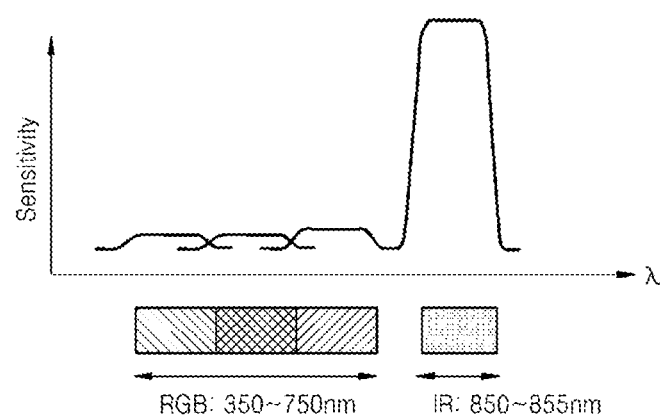

For example, referring to FIG. 15, the image sensor 143 includes a first sensing layer 143a that senses the blue light, a second sensing layer 143b that senses the green light, a third sensing layer 143c that senses the red light, and a fourth sensing layer 143d that senses the NIR ray, which are sequentially disposed from an upper side. As previously disclosed above, light having a relatively short wavelength may have a relatively shallow penetration depth with respect to a light absorption material such as silicon, and light having a relatively long wavelength may have a relatively deep penetration depth with respect to the light absorption material. Thus, the image sensor 143 may be configured so that the uppermost first sensing layer 143a senses the blue light (wavelength of about 400 nm to about 500 nm), and the lowermost fourth sensing layer 143d senses the NIR ray (wavelength of about 800 nm to about 900 nm).

Also, as shown in FIGS. 16A through 16D, the intensity of each of the sensing layers 143a to 143d may be selected so that each of the four sensing layers 143a to 143d accurately senses light of a corresponding color. For example, the first sensing layer 143a may be formed of a photosensitive material having high sensitivity with respect to blue light having a wavelength of about 400 nm to about 500 nm, and the second sensing layer 143b may be formed of a photosensitive material having high sensitivity with respect to green light having a wavelength of about 500 nm to about 600 nm. Also, the third sensing layer 143c may be formed of a photosensitive material having high sensitivity with respect to red light having a wavelength of about 600 nm to about 700 nm, and the fourth sensing layer 143d may be formed of a photosensitive material having high sensitivity with respect to light having a wavelength of about 800 nm to about 900 nm.

Alternatively, the sensing layers 143a to 143d may be formed of the same photosensitive material, instead of being formed of different photosensitive materials. In this case, a filter 145a configured to block the blue light may be disposed between the first sensing layer 143a and the second sensing layer 143b. Also, a filter 145b configured to block the green light may be disposed between the second sensing layer 143b and the third sensing layer 143c, and a filter 145c configured to block the red light may be disposed between the third sensing layer 143c and the fourth sensing layer 143d. Although, according to the exemplary embodiment shown in FIG. 15, the filters 145a, 145b, and 145c are added to separate the first through fourth sensing layers, according to other exemplary embodiments, the light absorption materials of each of the first through third sensing layers 143a-143c may also serve as optical filters by adjusting a thickness thereof. For example, the thickness of the light absorption material of the first sensing layer 143a may be adjusted to completely absorb the blue light within the first sensing layer 143a, the thickness of the light absorption material of the second sensing layer 143b may be adjusted to completely absorb the green light within the second sensing layer 143b, and the thickness of the light absorption material of the third sensing layer 143c may be adjusted to completely absorb the red light within the third sensing layer 143c.

As a result, the first sensing layer 143a may sense all of the blue, green, red, and illumination light. Also, the second sensing layer 143b may sense the green, red, and illumination light, the third sensing layer 143c may sense the red and illumination light, and the fourth sensing layer 143d may sense only the illumination light. Considering these relationships, the intensity of the blue light incident onto the first sensing layer 143a, the intensity of the green light incident onto the second sensing layer 143b, and the intensity of the red light incident onto the third sensing layer 143c may be calculated.

According to the current exemplary embodiment, since the blue, green, red, and illumination light may be sensed through the separate sensing layers 143a to 143d, respectively, a high fill factor may be obtained with respect to all colors. Thus, light utilization efficiency may be improved, and high resolution color and depth images may be obtained.

The above-described 3D image acquisition apparatus 100 may be applied to various fields. For example, the 3D image acquisition apparatus 100 may be applied to a range-finding device, a gesture recognizer, a game console, and the like.

For ease of understanding, exemplary embodiments with respect to the imaging optical system and the 3D image acquisition apparatus including the imaging optical system have been described with reference to the accompanying drawings. However, it should be understood that the exemplary embodiments described therein should be considered in a descriptive sense only and not for purposes of limitation. It is to be understood that the present disclosure is not limited to the exemplary embodiments as described above. This is done because there may be variations and modifications made by those skilled in the art.

What is claimed is:

1. An imaging optical system comprising:
   an optical shutter module configured to reflect light having a first wavelength band along a first reflection path without modulating the light having the first wavelength band and to modulate light having a second wavelength band and reflect the modulated light having the second wavelength band along a second reflection path parallel to the first reflection path; and
   an image sensor provided along the first reflection path and the second reflection path and configured to respectively sense the light having the first wavelength band and the modulated light having the second wavelength band, which are reflected by the optical shutter module, and to output a first image signal with respect to the light having the first wavelength band and a second image signal with respect to the modulated light having the second wavelength band.

2. The imaging optical system of claim 1, wherein the optical shutter module comprises an optical shutter configured to modulate the light having the second wavelength band with a predetermined gain waveform and a wavelength-selective mirror disposed on a light incident surface of the optical shutter to reflect the light having the first wavelength band and transmit the light having the second wavelength band,
   wherein the optical shutter module maintains a constant reflectance with respect to the light having the first wavelength band and has a reflectance varying according to a modulation signal with respect to the light having the second wavelength band.

3. The imaging optical system of claim 1, wherein the light having the first wavelength band is visible light, and the light having the second wavelength band is near-infrared (NIR) light,
wherein the image sensor comprises an array of a plurality of pixels, and each of the pixels comprises a red sub-pixel configured to sense red light, a green sub-pixel configured to sense green light, a blue sub-pixel configured to sense blue light, and an NIR sub-pixel configured to sense the NIR light.

4. The imaging optical system of claim 1, further comprising a time division filter disposed between the optical shutter module and the image sensor to selectively transmit one of the light having the first wavelength band and the modulated light having the second wavelength band.

5. The imaging optical system of claim 4, wherein the time division filter is configured to transmit the light having the first wavelength band during a first time period and the modulated light having the second wavelength band during a second time period, and
wherein the time division filter is configured to switch between a first color filter configured to transmit the light having the first wavelength band on an optical path between the optical shutter module and the image sensor, and a second color filter configured to transmit the modulated light having the second wavelength band on the optical path between the optical shutter module and the image sensor.

6. The imaging optical system of claim 5, wherein the time division filter is configured to transmit the light having the first wavelength band during a first time period and the modulated light having the second wavelength band during a second time period, and
wherein the light having the first wavelength band is visible light, and the light having the second wavelength band is near-infrared (NIR) light,
wherein the image sensor comprises an array of a plurality of pixels, and each of the pixels comprises a red sub-pixel configured to sense red light and the NIR light, a green sub-pixel configured to sense green light and the NIR light, and a blue sub-pixel configured to sense blue light and the NIR light.

7. The imaging optical system of claim 5, wherein the time division filter is configured to transmit the light having the first wavelength band during a first time period and the modulated light having the second wavelength band during a second time period, and
wherein the image sensor is configured to sense the light having the first wavelength band during the first time period and the modulated light having the second wavelength band during the second time period.

8. The imaging optical system of claim 1, wherein the image sensor comprises a first sensing layer configured to sense the light having the first wavelength band and a second sensing layer disposed under the first sensing layer such that the first sensing layer is disposed between the second sensing layer and the optical shutter module, the second sensing layer being configured to sense the light having the second wavelength band.

9. The imaging optical system of claim 8, wherein the light having the first wavelength band is visible light, and the light having the second wavelength band is near-infrared (NIR) light,
wherein the first sensing layer comprises a red sub-pixel configured to sense the visible light having red light, a green sub-pixel configured to sense the visible light having green light, and a blue sub-pixel configured to sense the visible light having blue light, and
wherein the first sensing layer further comprises a first color filter disposed on the red sub-pixel to transmit the red light and the NIR light, a second color filter disposed on the green sub-pixel to transmit the green light and the NIR light, and a third color filter disposed on the blue sub-pixel to transmit the blue light and the NIR light.

10. The imaging optical system of claim 8, wherein the light having the first wavelength band is visible light, and the light having the second wavelength band is near-infrared (NIR) light,
wherein the first sensing layer comprises a red sub-pixel configured to sense the visible light having red light, a green sub-pixel configured to sense the visible light having green light, and a blue sub-pixel configured to sense the visible light having blue light, and
wherein the second sensing layer comprises an NIR sub-pixel configured to sense the NIR light.

11. The imaging optical system of claim 8, further comprising a filter disposed between the first sensing layer and the second sensing layer to block the light having the first wavelength band.

12. The imaging optical system of claim 1, wherein the image sensor comprises four sensing layers which are vertically stacked to respectively sense visible light having one of four light colors,
wherein the light having the first wavelength band is visible light, and the light having the second wavelength band is near-infrared (NIR) light, and
wherein the four sensing layers comprise a first sensing layer configured to sense visible light having a blue light, a second sensing layer configured to sense visible light having green light, a third sensing layer configured to sense visible light having red light, and a fourth sensing layer configured to sense the NIR light, which are sequentially disposed from an upper side closest to the optical shutter module to a lower side farthest from the optical shutter module.

13. The imaging optical system of claim 12, further comprising a first filter disposed between the first sensing layer and the second sensing layer to block the blue light, a second filter disposed between the second sensing layer and the third sensing layer to block the green light, and a third filter disposed between the third sensing layer and the fourth sensing layer to block the red light.

14. The imaging optical system of claim 1, further comprising a single objective lens configured to focus the light having the first wavelength band and the light having the second wavelength band, wherein the light having the first wavelength band and the light having the second wavelength band are reflected from an external object and incident on the optical shutter module via the objective lens.

15. The imaging optical system of claim 1, wherein the image sensor comprises a plurality of sensing layers configured to respectively sense the first light beam and the modulated second light beam which are reflected by the optical shutter module,
wherein the sensing layers are stacked upon each other according to penetration depth capabilities of the first light beam and the modulated second light beam.

* * * * *